(No Model.)
R. TSCHUMY.
HANDLE ATTACHMENT FOR SHOVELS, &c.
No. 403,310. Patented May 14, 1889.
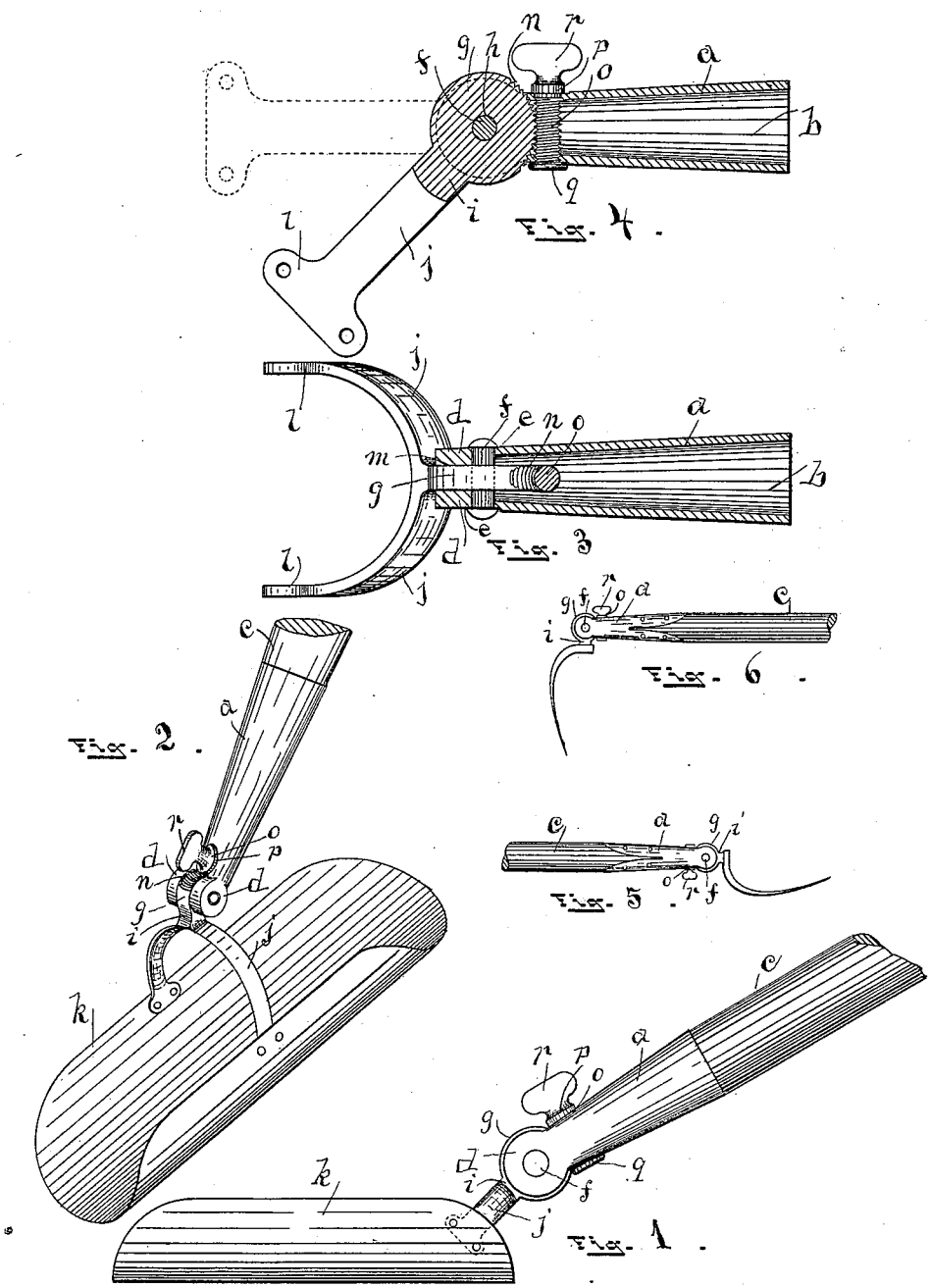

UNITED STATES PATENT OFFICE.

ROBERT TSCHUMY, OF CHATTANOOGA, TENNESSEE.

HANDLE ATTACHMENT FOR SHOVELS, &c.

SPECIFICATION forming part of Letters Patent No. 403,310, dated May 14, 1889.

Application filed June 15, 1888. Serial No. 277,230. (No model.)

*To all whom it may concern:*

Be it known that I, ROBERT TSCHUMY, a citizen of the United States, residing at Chattanooga, in the county of Hamilton and State of Tennessee, have invented certain new and useful Improvements in Handle Attachments for Shovels, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention herein described relates to devices for attaching the handle to the blade of shovels, hoes, &c., and also attaching the handle to a fork, manure-hook, and implements of a similar character; and the invention consists, chiefly, in the combination, arrangement, and construction of the device, as I hereinafter fully describe, and specifically set forth in the claim of this specification.

The objects of this invention are, first, to construct a device whereby the angle or pitch of the blade of a shovel or other implement may be adjusted in relation to the handle thereof to suit the will or fancy of the user.

A second object of this invention is to construct a device by means of which the pitch or angle of an implement of the nature of a shovel or fork may be changed in relation to its handle, in order to better adapt the implement to perform a greater range of work.

A third object is to provide a means whereby the handle of a shovel, hoe, fork, &c., may be quickly and easily adjusted without extra or supplementary tools.

A fourth object of this invention is to arrange a device for securing the handle to a shovel or other implement in a strong and durable manner, and so it may easily be adjusted to and rigidly retained in any desired position by the revolution of an adjusting-screw.

I attain these objects by the means illustrated in the accompanying drawings, in which—

Figure 1 represents a side view of a drain-shovel embodying my improvement; Fig. 2, a view in perspective of a drain-shovel of a different form and containing my improvement. Fig. 3 is a top or plan view of my invention, partly sectional. Fig. 4 is a vertical central section of the same. Fig. 5 shows the device as attached to a potato-fork. Fig. 6 shows the fork adjusted to form a potato-rake.

$a$ is a socket provided with a central opening, $b$, for the insertion of a handle, $c$, the socket herein shown being of solid cylindrical form, but any other form may be used or straps above and below the handle may be used, if desired, for securing the socket to the handle. The outer end of this socket is provided upon each side with forwardly-projecting ear-pieces $d$, which are in turn provided with central openings, $e$, through which are passed a pin, $f$.

In the space $m$, between the ear-pieces $d$, is placed a portion, $g$, of a circular form, and which is also provided with a central opening, $h$, and through this opening is also passed the pin $f$, thereby securing the part $g$ in position between the ear-pieces.

As shown in the drawings, extending from the outer rim of the part $g$ is a short shank portion, $i$, and $j$ is a bail extending laterally from each side of the shank-piece, the outer ends, $l\ l$, of the bail-arms being provided with rivet-holes or other suitable devices, by means of which a shovel-blade, $k$, is attached thereto.

Of course the form and construction of the bail are not necessarily confined to the precise construction herein shown, as shovel-blades of other forms would require a bail of some other form in order to properly make the attachment thereto, and in making an attachment to the blade of a hoe, fork, or implement of a like nature a shank only would be required.

The circular portion $g$ is provided on a portion of its periphery with the teeth $n$, fitted to engage or intermesh with the thread of a screw, $o$, which is passed vertically through the socket $a$, the space $m$ being extended beyond the ear-pieces into the socket to receive the screw. This screw $o$ is provided on the portions projecting above and below the socket with the shoulders $p$ and $q$, which operate to retain the screw in position, and on the upper end of the screw is a portion, $r$, of a suitable form to conveniently revolve the screw by the hand. This construction of the portion $g$, the ear-pieces, and the adjusting-screw is substantially the same in all the attachments, and the parts are placed in position by first passing the adjusting-screw in the space $m$, then placing the portion $g$ between the ear-pieces, and with the threaded portion of its periphery in engagement with the thread of the screw. The pin $f$ is then passed through the ear-pieces and the part $g$, and the parts are then in position for operation, the screw $o$ being revolved to adjust the shovel-blade or implement to the desired position for the work upon which it is to be used.

It will be seen, of course, that the device being attached to a fork, as shown in Figs. 5 and 6, allows the fork to be adjusted for other uses, as for a potato or manure hook, and the same may be said of a hoe or shovel, and forms a strong, convenient, and durable means of adjusting the position of whatever implement it may be applied to, which permits the tool to be used in various ways and in numerous places, which would otherwise require a different and separate tool, or the use of the implement would be rendered unsatisfactory and inconvenient, if not altogether impracticable.

I am aware that devices are in use for adjusting a shovel or hoe to various positions; but in all of the means heretofore used the parts have to be disconnected by removing a pin or other engaging device, so that considerable trouble is necessary to make the adjustment, which is also limited to certain positions whereas by making the screw engage with the periphery of the portion $g$ the adjustment may be very fine and unlimited, and is accomplished by merely turning the screw and without disengaging any of the parts, so that there is no liability of the parts becoming accidentally disconnected and lost.

Having described my invention, what I claim is—

The combination, with the bail or shank of a shovel or other implement provided with a circular projecting portion, $g$, having on its periphery worm-screw teeth, a handle-socket provided on one end with ear-pieces placed on each side of the said portion $g$, and a pin, $f$, passed through the said ear-pieces and the portion $g$, of an adjusting-screw, $o$, passed through the socket and provided with shoulders $p$ and $q$ above and below the socket, and with the thread on its body portion between the shoulders engaging with the teeth on the said portion $g$, substantially as set forth.

In testimony whereof I affix my signature in presence of two witnesses.

ROBERT TSCHUMY.

Witnesses:
S. B. MOE,
F. M. CUSHMAN.